JAMES RAFTER.
Improvement in Cotton-Seed Planters and Guano-Distributers.

No. 114,600. Patented May 9, 1871.

UNITED STATES PATENT OFFICE.

JAMES RAFTER, OF WINONA, MISSISSIPPI.

IMPROVEMENT IN COTTON-SEED PLANTERS AND GUANO-DISTRIBUTERS.

Specification forming part of Letters Patent No. 114,600, dated May 9, 1871.

*To all whom it may concern:*

Be it known that I, JAMES RAFTER, of Winona, in the county of Carroll and State of Mississippi, have invented a new and useful Improvement in Cotton-Planter and Guano-Distributer; and I do hereby declare that the following is a full, clear, and exact description thereof, which will enable others skilled in the art to make and use the same, reference being had to the accompanying drawing, forming part of this specification, in which—

Figure 1:
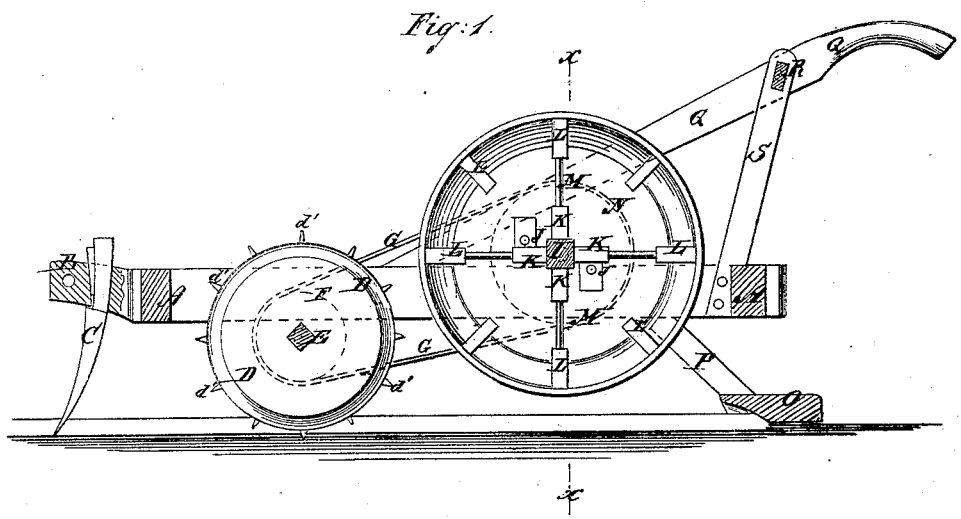
Figure 2:
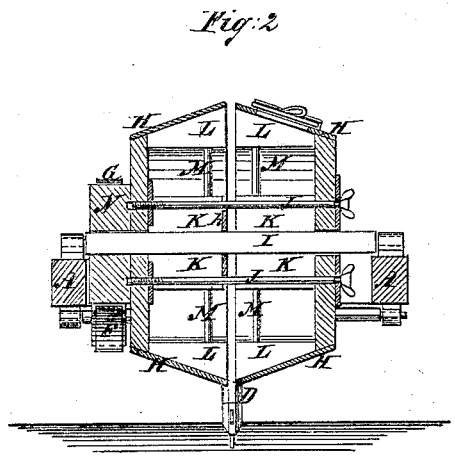

Figure 1 is a vertical longitudinal section of my improved machine. Fig. 2 is a vertical cross-section of the same, taken through the line $x\ x$, Fig. 1.

Similar letters of reference indicate corresponding parts.

My invention has for its object to furnish an improved machine for planting cotton and distributing guano, which shall be simple in construction and effective in operation, and so constructed that it may be easily and conveniently adjusted to distribute more or less of the seed or fertilizer to the acre, as may be desired; and it consists in the construction and combination of various parts of the machine, as hereinafter more fully described.

A is the frame of the machine, consisting of two side bars, connected at their front and rear ends by two cross-bars. To the center of the front cross-bar of the frame A is attached a short bar, B, to which the draft is attached.

C is the plow or tooth for opening the furrow to receive the seed. The upper end of the shank or standard of the plow C passes up through a hole in the bar B, and is adjustably secured in place by a wedge, as shown in Fig. 1.

D is a wheel, the face or rim of which is made wedge or V shaped, to press out the sides of the furrow and keep them from falling in before the seed has been deposited. Upon the edge or face of the wheel D are formed, or to it are attached, teeth or prongs $d'$, which take hold of the ground in the bottom of the furrow to prevent the said wheel from sliding and insure its revolving as the machine is drawn forward. The wheel D is attached to the center of the shaft E, so as to be directly in the rear of the plow C. The journals of the shaft E revolve in bearings attached to the under side of the side bars of the frame A, and to said shaft E is attached a pulley or band-wheel, F, to receive the band or belt G, to drive the dropping-drum.

H is the dropping-drum, which is made in two parts, somewhat in the shape of a barrel divided transversely through the center. One of the parts of the drum H is rigidly attached to the shaft I, and the other of said parts is movable upon said shaft, so that it may be moved toward or from the other part of said drum, to lessen or widen the space between the said parts, according as it is desired to distribute less or more of the seed or guano to the acre.

J are two hand-screws, which are swiveled to one part of the drum H, and screw into nuts attached to the other part, so that by turning the said screws in one direction the two parts of the drum will be moved toward each other, and by turning the said screws in the other direction the said parts will be moved from each other.

Upon the sides of the shaft I, within the cavity of the parts of the drum H, are placed ribs K, which ribs in the case of the stationary part of the drum may be attached directly to said shaft; but in the case of the movable part of said drum the said ribs should be attached to the said part of the drum, so as to move back and forth with it. In this case the inner end of the ribs K should be attached to guide-plate, $k'$, through which the shaft I passes, to keep the said ribs in their proper relative positions.

To the inner surface of the shells of the parts of the drum H are attached ribs L, as shown in Figs. 1 and 2, so as when the drum is revolved to prevent the seed or guano from sliding around in said drum.

The ends of the ribs K may be supported and the parts of the drum strengthened by rods or braces M, as shown in Figs. 1 and 2.

To the shaft I, at one end of the drum H, is attached a pulley or band-wheel, N, around which the band G passes to revolve the said drum by the advance of the machine.

O is the covering-block, the lower side of which is concaved to give a proper form to the top of the ridge or row, and the ends of which are attached to the rear ends of the bars P, the upper ends of which are attached to the side bars of the frame A.

Q are the handles, the forward ends of which are attached to the side bars of the frame A. The rear ends of the handles are connected and held in their proper relative position by a cross-bar or round, R, and are supported and held at the proper elevation by the uprights S, the lower ends of which are attached to the rear part of the frame A and their upper ends to the handles Q or cross-bar R.

Having thus described my invention, I claim as new and desire to secure by Letters Patent—

The ribs K and L, in combination with the movable and stationary parts of the drum H, and with the shaft I, substantially as herein shown and described, and for the purpose set forth.

JAMES RAFTER.

Witnesses:
CHINNOIS BROOKE,
WILLIS BARFIELD.